United States Patent
Lee et al.

(10) Patent No.: US 9,407,479 B2
(45) Date of Patent: Aug. 2, 2016

(54) PULSE WIDTH MODULATION DATA RECOVERY DEVICE AND DRIVING METHOD THEREOF

(71) Applicant: SAMSUNG ELECTRONICS CO., LTD., Suwon-Si, Gyeonggi-Do (KR)

(72) Inventors: June-Hee Lee, Yongin-Si (KR); Jun-Han Bae, Yongin-Si (KR); Bong-Kyu Kim, Seoul (KR); Jong-Jae Ruy, Hwaseong-Si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/710,713

(22) Filed: May 13, 2015

(65) Prior Publication Data
US 2016/0013957 A1    Jan. 14, 2016

(30) Foreign Application Priority Data

Jul. 14, 2014    (KR) .................. 10-2014-0088507

(51) Int. Cl.
*H03K 7/08*    (2006.01)
*H04L 25/49*    (2006.01)
*H04L 25/02*    (2006.01)
*H04L 7/033*    (2006.01)

(52) U.S. Cl.
CPC .......... *H04L 25/4902* (2013.01); *H04L 7/0331* (2013.01); *H04L 25/0272* (2013.01)

(58) Field of Classification Search
CPC ...... H03K 7/08; H04L 25/4902; H03F 3/217; H03F 2200/351; G06F 1/025
USPC .......................... 375/238, 254, 316, 219, 295
See application file for complete search history.

(56) References Cited

U.S. PATENT DOCUMENTS

| | | | |
|---|---|---|---|
| 7,801,203 B2 | 9/2010 | Chen et al. | |
| 8,564,365 B2 | 10/2013 | Dang et al. | |
| 2013/0342249 A1 | 12/2013 | Yang | |
| 2014/0361829 A1* | 12/2014 | Seth | H03K 9/08 329/312 |
| 2015/0263676 A1* | 9/2015 | Lu | H03F 1/0233 330/260 |

FOREIGN PATENT DOCUMENTS

| | | |
|---|---|---|
| JP | 2011-087243 | 4/2011 |
| KR | 100260795 | 4/2000 |

* cited by examiner

*Primary Examiner* — Zewdu Kassa
(74) *Attorney, Agent, or Firm* — F. Chau & Associates, LLC

(57) ABSTRACT

A pulse width modulation (PWM) data recovery device includes a differential-to-single (DTS) circuit configured to generate a PWM bit using a differential data signal including a differential positive data signal and a differential negative data signal, and an alignment buffer configured to activate a bit lock signal by detecting a synch pattern, recover symbol data by receiving the PWM bit in synchronization with one of the differential positive data signal and the differential negative data signal, and transmit the symbol data in synchronization with a reference clock.

18 Claims, 14 Drawing Sheets

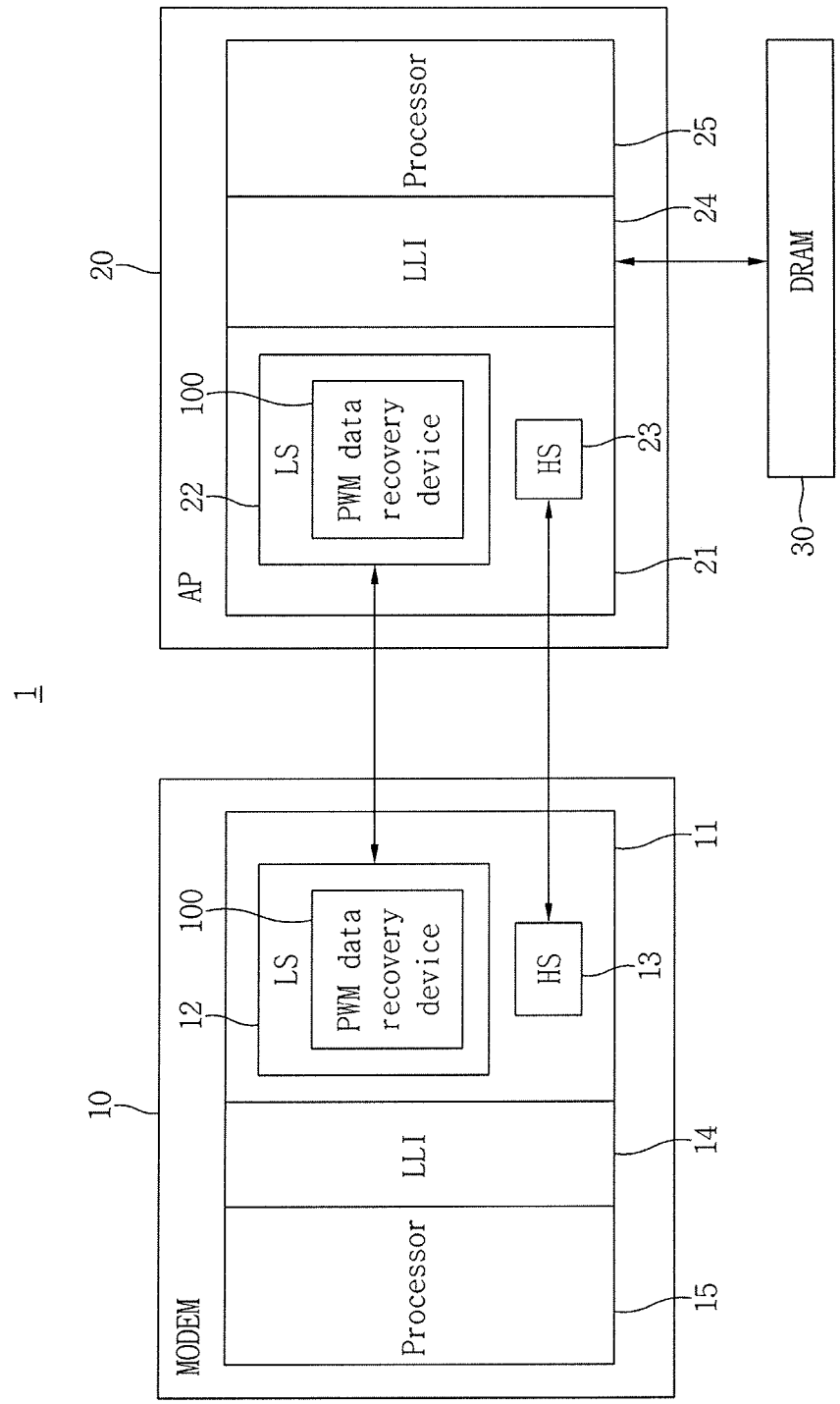

ized. In an exemplary embodiment, the alignment buffer may compare the synch pattern with the PWM bits received from the DTS circuit and activate the bit lock signal according to the compared result.

PULSE WIDTH MODULATION DATA RECOVERY DEVICE AND DRIVING METHOD THEREOF

CROSS-REFERENCE TO RELATED APPLICATIONS

This application claims priority under 35 U.S.C. §119 to Korean Patent Application No. 10-2014-0088507 filed on Jul. 14, 2014, the disclosure of which is incorporated by reference herein in its entirety.

TECHNICAL FIELD

Exemplary embodiments of the inventive concept relate to a pulse width modulation (PWM) data recovery device, and more particularly, to a PWM data recovery device that receives a PWM bit and generates symbol data in synchronization with a differential positive data signal, and transmits the symbol data in synchronization with the reference clock, and a method of driving the same.

DISCUSSION OF THE RELATED ART

A pulse width modulation (PWM) data transmission method may be applied between, for example, an application processor (AP) and a modulator-demodulator (MODEM), or between an AP and a (U)SIM interface. For example, a PWM data transmission method may be applied to configure a protocol between an AP and a MODEM or between an AP and a U(SIM) interface.

SUMMARY

Exemplary embodiments of the inventive concept provide a pulse width modulation (PWM) data recovery device that generates symbol data in synchronization with a differential positive data signal and transmits the symbol data in synchronization with a reference clock.

Exemplary embodiments of the inventive concept provide a method of driving the PWM data recovery device.

According to an exemplary embodiment of the inventive concept, a pulse width modulation (PWM) data recovery device includes a differential to single (DTS) circuit configured to generate a PWM bit using a differential data signal including a differential positive data signal and a differential negative data signal, and an alignment buffer configured to activate a bit lock signal by detecting a synch pattern, recover symbol data by receiving the PWM bit in synchronization with one of the differential positive data signal and the differential negative data signal, and transmit the symbol data in synchronization with a reference clock.

In an exemplary embodiment, the differential positive data signal and the differential negative data signal may have a phase opposite to each other.

In an exemplary embodiment, the alignment buffer may store the PWM bit in units of bits in synchronization with the differential positive data signal or the differential negative data signal, and transmit the symbol data in units of symbols in synchronization with the reference clock.

In an exemplary embodiment, the DTS circuit may delay one of the differential positive data signal and the differential negative data signal.

In an exemplary embodiment, the PWM data recovery device may further include a PWM data processing logic circuit configured to receive the symbol data in synchronization with the reference clock.

In an exemplary embodiment, the alignment buffer may compare the synch pattern with the PWM bits received from the DTS circuit and activate the bit lock signal according to the compared result.

In an exemplary embodiment, the DTS circuit may include a decoder configured to transform the differential data into the PWM bit, and the decoder may be an integrator-type decoder or an oversampling-type decoder.

In an exemplary embodiment, the reference clock may be a phase locked loop (PLL) reference clock.

According to an exemplary embodiment of the inventive concept, a method of driving a PWM data recovery device includes generating a PWM bit using a differential data signal, activating a bit lock signal by detecting a synch pattern, recovering symbol data by receiving the PWM bit in synchronization with the differential data signal in response to the bit lock signal being activated, and transmitting the symbol data in synchronization with a reference clock.

In an exemplary embodiment, the differential data signal may include a differential positive data signal and a differential negative data signal, and the differential positive data signal and the differential negative data signal may have a phase opposite to each other.

In an exemplary embodiment, recovering the symbol data by receiving the PWM bit in synchronization with the differential data signal when the bit lock signal is activated may include storing the PWM bit in units of bits in synchronization with the differential positive data signal or the differential negative data signal.

In an exemplary embodiment, the method may further include delaying one of the differential positive data signal and the differential negative data signal.

In an exemplary embodiment, transmitting the symbol data in synchronization with a reference clock may include transmitting the symbol data in units of symbols in synchronization with the reference clock.

In an exemplary embodiment, activating the bit lock signal by detecting a synch pattern may include comparing the synch pattern with the received PWM bits and activating the bit lock signal according to the comparison result.

In an exemplary embodiment, the reference clock may include a PLL reference clock.

According to an exemplary embodiment of the inventive concept, a system-on-chip (SoC) includes a modulator-demodulator (MODEM) including a first physical layer. The first physical layer includes a first low speed unit and a first high speed unit. The SoC further includes an application processor (AP) including a second physical layer. The second physical layer includes a second low speed unit and a second high speed unit. The MODEM and the AP communicate with each other through the first and second physical layers, and each of the first and second low speed units includes a PWM data recovery device including a DTS circuit configured to generate a PWM bit using a differential data signal including a differential positive data signal and a differential negative data signal, and an alignment buffer configured to activate a bit lock signal by detecting a synch pattern, recover symbol data by receiving the PWM bit in synchronization with one of the differential positive data signal and the differential negative data signal, and transmit the symbol data in synchronization with a reference clock.

BRIEF DESCRIPTION OF THE DRAWINGS

The above and other features of the present inventive concept will become apparent by describing in detail exemplary embodiments thereof with reference to the accompanying drawings, in which:

FIG. 1 is a block diagram illustrating a system-on-chip (SoC) according to an exemplary embodiment of the inventive concept.

DETAILED DESCRIPTION OF THE EXEMPLARY EMBODIMENTS

Figure 2A:
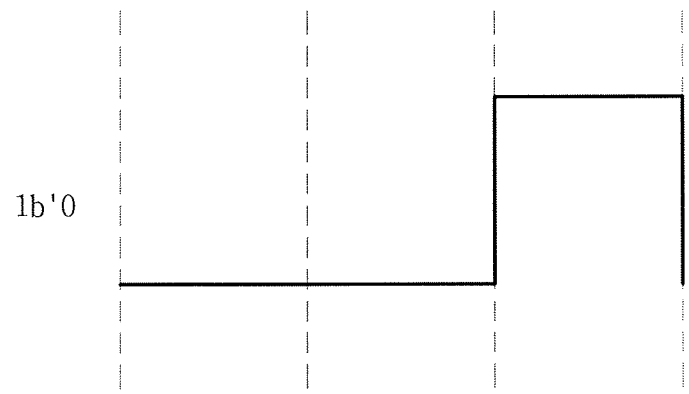
FIGS. 2A and 2B are timing diagrams illustrating a logic "0" and a logic "1" according to a pulse width modulation (PWM) data communication method according to an exemplary embodiment of the inventive concept.

Exemplary embodiments of the inventive concept will be described more fully hereinafter with reference to the accompanying drawings. Like reference numerals may refer to like elements throughout the drawings.

It will be understood that, although the terms "first," "second," etc. may be used herein in reference to elements of the inventive concept, such elements should not be construed as being limited by these terms. For example, a first element could be termed a second element, and a second element could be termed a first element, without departing from the scope of the present inventive concept.

It will be understood that when an element is referred to as being "connected" or "coupled" to another element, it can be directly connected or coupled to the other element or intervening elements may be present.

FIG. 1 is a block diagram illustrating a system-on-chip (SoC) according to an exemplary embodiment of the inventive concept.

Referring to FIG. 1, the SoC 1 may include a modulator-demodulator (MODEM) 10, an application processor (AP) 20, and a dynamic random access memory (DRAM) 30. The MODEM 10 may include a first physical layer M-PHY 11, a first low latency interface (LLI) 14, and a first processor 15.

The first physical layer M-PHY 11 may include a first low speed (LS) unit 12 that implements low-speed data communication and a first high speed (HS) unit 13 that implements high-speed data communication. The first physical layer M-PHY 11 physically connects the MODEM 10 to the AP 20. Accordingly, the MODEM 10 and the AP 20 may perform data communication through the first physical layer M-PHY 11. The first LLI 14 connects the first physical interface M-PHY 11 to the first processor 15 according to an LLI specification. The first processor 15 may control an operation of the MODEM 10. The first processor 15 may include, for example, an ARM™ processor, however the first processor 15 is not limited thereto.

The AP 20 may include a second physical layer M-PHY 21, a second LLI 24, and a second processor 25. The second physical layer M-PHY 21 may include a second LS unit 22 that implements low-speed data communication and a second HS unit 23 that implements high-speed data communication. The second physical layer M-PHY 21 physically connects the MODEM 10 to the AP 20. Accordingly, the MODEM 10 and the AP 20 may perform data communication through the second physical layer M-PHY 21. The second LLI 24 connects the second physical layer M-PHY 21 to the second processor 25 according to an LLI specification. The second processor 25 may control an operation of the AP 20. The second processor 25 may include, for example, an ARM™ processor, however the second processor 25 is not limited thereto.

The MODEM 10 and the AP 20 may transmit and receive low-speed pulse width modulation (PWM) data through the first and second LS units 12 and 22 to implement low-speed data communication. In an exemplary embodiment, the speed of the data communication between the first and second LS units 12 and 22 may be, for example, about 1 Mbps. However, the speed of the data communication between the first and second LS units 12 and 22 is not limited thereto. The PWM data may be transmitted without synchronizing with a clock. That is, a PWM data communication method may utilize self-clocking.

Each of the first and second LS units 12 and 22 may perform data communication according to the PWM data communication method described herein (e.g., a PWM data communication method in which data is transmitted and received without utilizing a clock). A logic "0" and a logic "1" according to the PWM data communication method is described with reference to FIGS. 2A and 2B.

Each of the first and second LS units 12 and 22 may include a PWM data recovery device 100 configured to recover PWM data. The PWM data recovery device 100 according to an exemplary embodiment of the inventive concept is described with reference to FIG. 4.

Data communication between the first and second HS units 13 and 23 may be high-speed data communication. For example, in an exemplary embodiment, the speed of the data communication between the first and second HS units 13 and 23 may be about 3 Gbps or about 6 Gbps. However, the speed of the data communication between the first and second HS units 13 and 23 is not limited thereto.

In an exemplary embodiment, the SoC 1 may include the MODEM 10 and the AP 20. According to exemplary embodiments, the MODEM 10 and the AP 20 may be embodied together in one independent chip or in separate chips.

Figure 2B:
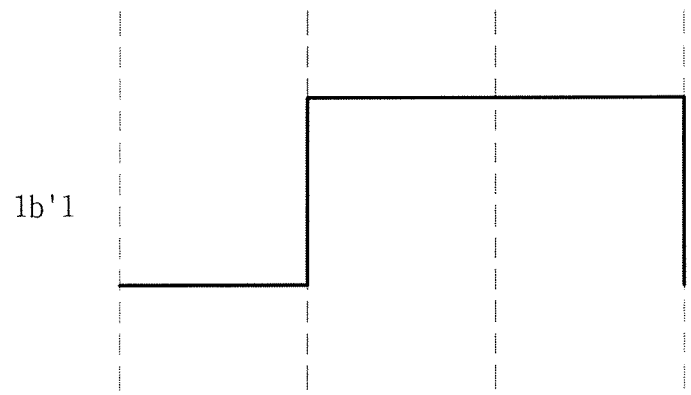

FIGS. 2A and 2B are timing diagrams illustrating a logic "0" and a logic "1" according to a PWM data communication method according to an exemplary embodiment of the inventive concept.

FIG. 2A illustrates the logic "0" according to the PWM data communication method according to an exemplary embodiment. For example, when a duty ratio between a low state duration and a high state duration is 2:1, PWM data denotes the logic "0".

FIG. 2B illustrates the logic "1" according to the PWM data communication method according to an exemplary embodiment. For example, when a duty ratio between a low state duration and a high state duration is 1:2, PWM data denotes the logic "1".

Figure 3A:
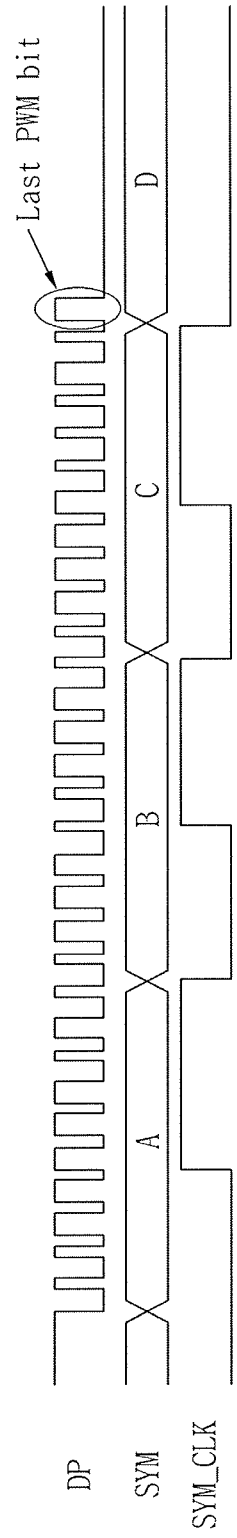
FIGS. 3A and 3B are timing diagrams illustrating a logic "0" and a logic "1" according to a PWM data communication method relating to a comparative example.
Figure 3B:
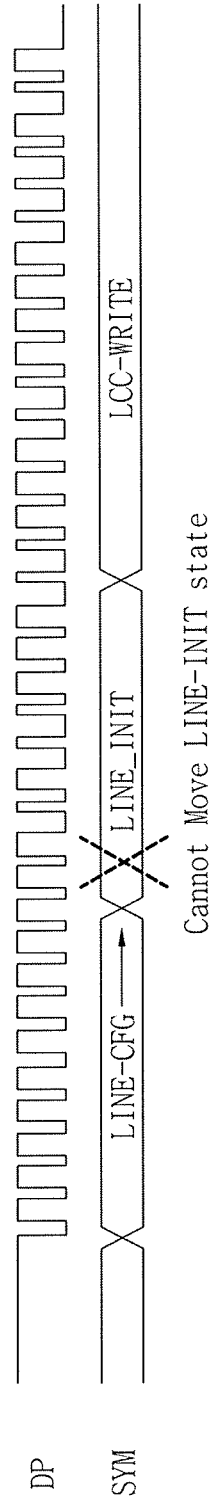

FIGS. 3A and 3B are timing diagrams illustrating a logic "0" and a logic "1" according to a PWM data communication method relating to a comparative example.

Referring to FIGS. 1 and 3A, a PWM method may provide self-clocking. For example, a PWM signal may include data and a clock signal. Accordingly, a clock may not exist during an interval that does not include a PWM data signal.

A PWM data recovery device 100 may receive a differential positive data signal DP. The PWM data recovery device 100 may generate symbol data SYM using the differential positive data signal DP. The PWM data recovery device 100 may transmit the symbol data SYM in synchronization with a symbol clock SYM_CLK.

Generally, when transmitting data to the AP 20, the MODEM 10 may transmit data by units of symbols.

When the PWM data recovery device 100 receives a last bit of the differential positive data signal DP, the last bit of the differential positive data signal DP may not be transformed as the symbol data SYM since the PWM data signal having a clock function does not exist. As a result, the last symbol data SYM may not be generated.

Referring to FIGS. 1 and 3B, the PWM data recovery device 100 may receive a differential positive data signal DP. The PWM data recovery device 100 may generate symbol data SYM using the differential positive data signal DP.

If the PWM data signal is misaligned or a meaningless PWM data signal is initially input, the PWM data recovery device 100 may not generate the correct symbol data SYM. Further, the PWM data recovery device 100 may not perform an operation such as, for example, a mode change since the symbol data SYM is incorrectly transformed.

The MODEM 10 may determine an operation mode according to the symbol data SYM. For example, the PWM data recovery device 100 may include a finite state machine (FSM). The FSM may perform a mode change operation according to the received symbol data SYM. However, when the transformed wrong symbol data SYM is input, the FSM may not perform an operation such as, for example, a mode change.

Figure 4:
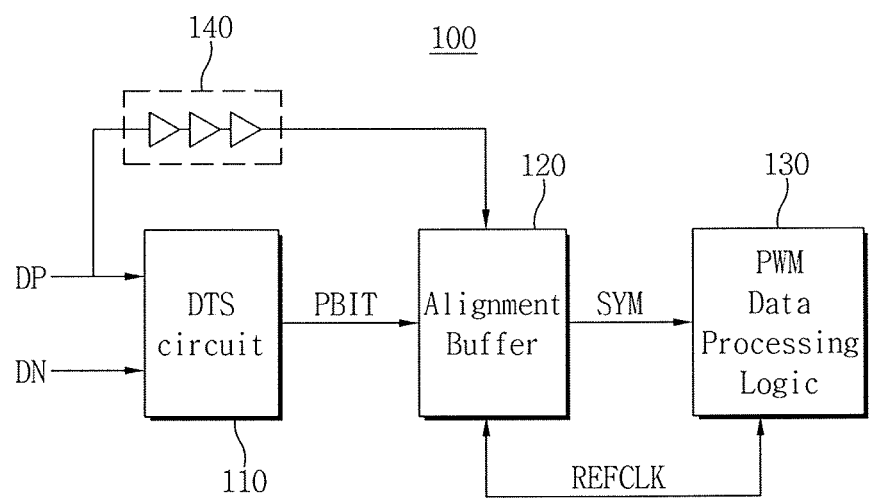
FIG. 4 is a block diagram illustrating a PWM data recovery device according to an exemplary embodiment of the inventive concept.

FIG. 4 is a block diagram illustrating a PWM data recovery device according to an exemplary embodiment of the inventive concept.

Referring to FIG. 4, a PWM data recovery device 100 includes a differential-to-single (DTS) circuit 110, an alignment buffer 120, a PWM data processing logic circuit 130, and a delay unit 140.

The DTS circuit 110 receives a differential data signal. The differential data signal may include, for example, a differential positive data signal DP and a differential negative data signal DN.

The DTS circuit 110 may generate a single PWM bit PBIT using the differential positive data signal DP and the differential negative data signal DN. The DTS circuit 110 may include, for example, a decoder that generates the single PWM bit PBIT. In an exemplary embodiment, the decoder may be embodied as an integrator type decoder according to an analog method or an oversampling type decoder according to a digital method, however the decoder is not limited thereto.

The decoder of the integrator type may be affected by, for example, a variation of a process, a voltage, and a temperature (PVT). The decoder of an oversampling type may use a system clock.

The DTS circuit 110 may delay the differential positive data signal DP using the delay unit 140. The alignment buffer 120 may receive the PWM bit PBIT in synchronization with the delayed differential positive data signal DP.

The alignment buffer 120 generates symbol data SYM using the PWM bit PBIT. The alignment buffer 120 transmits the symbol data SYM in synchronization with a reference clock REFCLK. A write operation and a read operation of the alignment buffer 120 are described in detail with reference to FIG. 9.

The PWM data processing logic circuit 130 receives the symbol data SYM in synchronization with the reference clock REFCLK. The PWM data processing logic circuit 130 may process the symbol data SYM. In an exemplary embodiment, the reference clock REFCLK may be a phase locked loop (PLL) reference clock.

A method of driving the PWM data recovery device 100 according to an exemplary embodiment of the present inventive concept is described with reference to FIGS. 5 and 6.

Figure 5A:
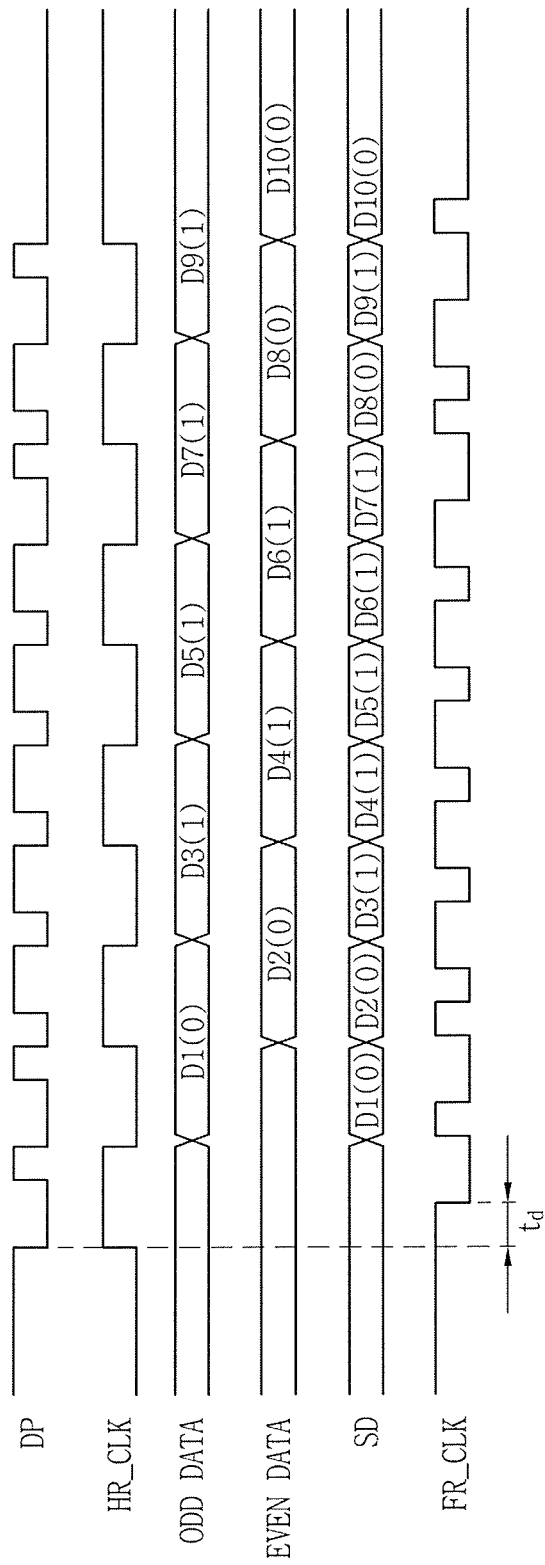
FIGS. 5A and 5B are timing diagrams illustrating an operation of the PWM data recovery device shown in FIG. 4 according to an exemplary embodiment of the inventive concept.
Figure 5B:
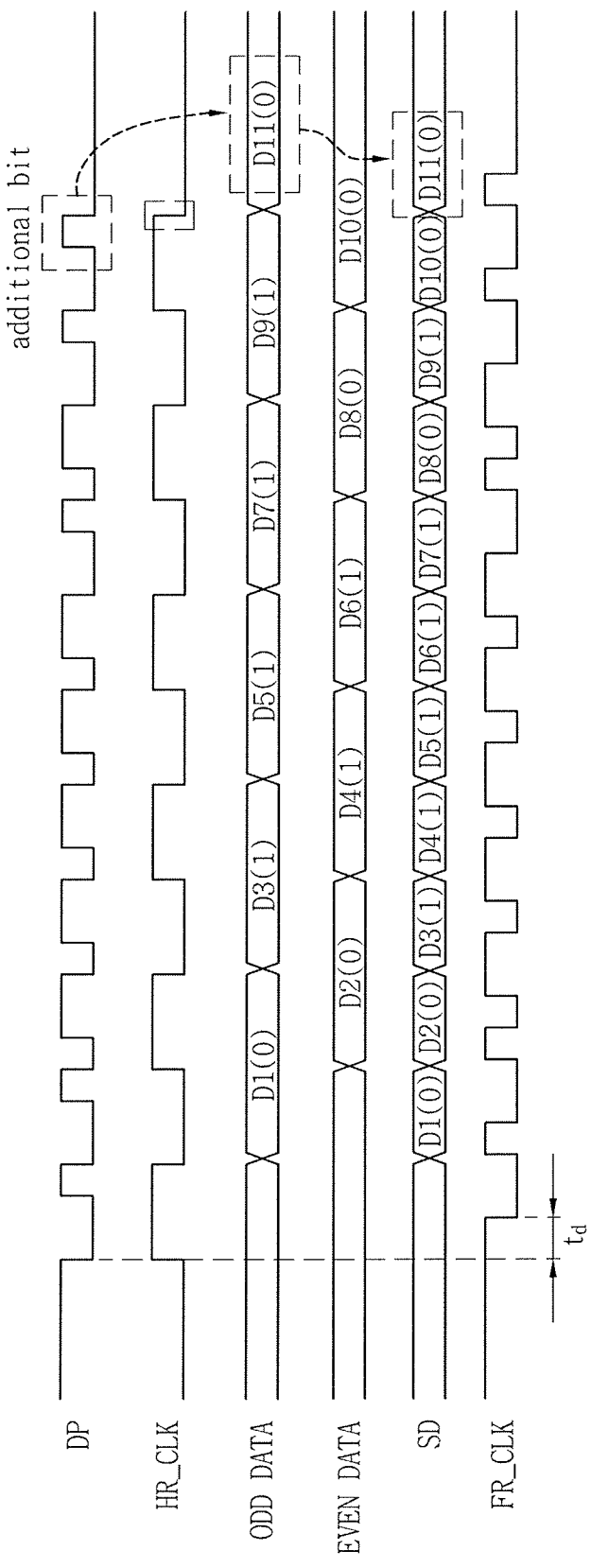

FIGS. 5A and 5B are timing diagrams illustrating an operation of the PWM data recovery device shown in FIG. 4 according to an exemplary embodiment of the inventive concept.

Referring to FIGS. 4 and 5A, the DTS circuit 110 receives a differential positive data signal DP and a differential negative data signal DN. The differential positive data signal DP and the differential negative data signal DN have a phase opposite to each other.

The DTS circuit 110 may generate a half-rate clock HR_CLK using the differential positive data signal DP. The DTS circuit 110 may decode an odd-numbered PWM bit PBIT using the differential positive data signal DP and the differential negative data signal DN in synchronization with a falling edge of the half-rate clock HR_CLK.

Further, the DTS circuit 110 may decode an even-numbered PWM bit PBIT using the differential positive data signal DP and the differential negative data signal DN in synchronization with a rising edge of the half-rate clock HR_CLK.

The DTS circuit 110 may include a decoder that decodes the odd-numbered PWM bit PBIT and the even-numbered PWM bit PBIT. The DTS circuit 110 may generate serial data SD using the odd-numbered PWM bit PBIT and the even-numbered PWM bit PBIT. The DTS circuit 110 may generate a full-rate clock FR_CLK by applying a constant delay (e.g., $t_d$) to the differential positive data signal DP.

The DTS circuit 110 may transmit the serial data SD to the alignment buffer 120 in synchronization with a rising edge of the full-rate clock FR_CLK.

Retelling to FIGS. 4 and 5B, the DTS circuit 110 may receive the differential positive data signal DP and the differential negative data signal DN. For example, as illustrated in FIG. 5B, the DTS circuit 110 receives an 11$^{th}$ differential positive data signal DP.

The DTS circuit 110 may decode the odd-numbered PWM bit PBIT using the differential positive data signal DP in synchronization with a falling edge of the half-rate clock HR_CLK. For example, the DTS circuit 110 transforms the 11$^{th}$ differential positive data signal DP into the serial data SD.

The DTS circuit 110 may transmit the serial data SD to the alignment buffer 120 in synchronization with a rising edge of the full-rate clock FR_CLK.

The DTS circuit 110 may generate a clock edge per PWM bit PBIT. Accordingly, the DTS circuit 110 may recover an additional 1 bit as a PWM bit PBIT.

Figure 6:
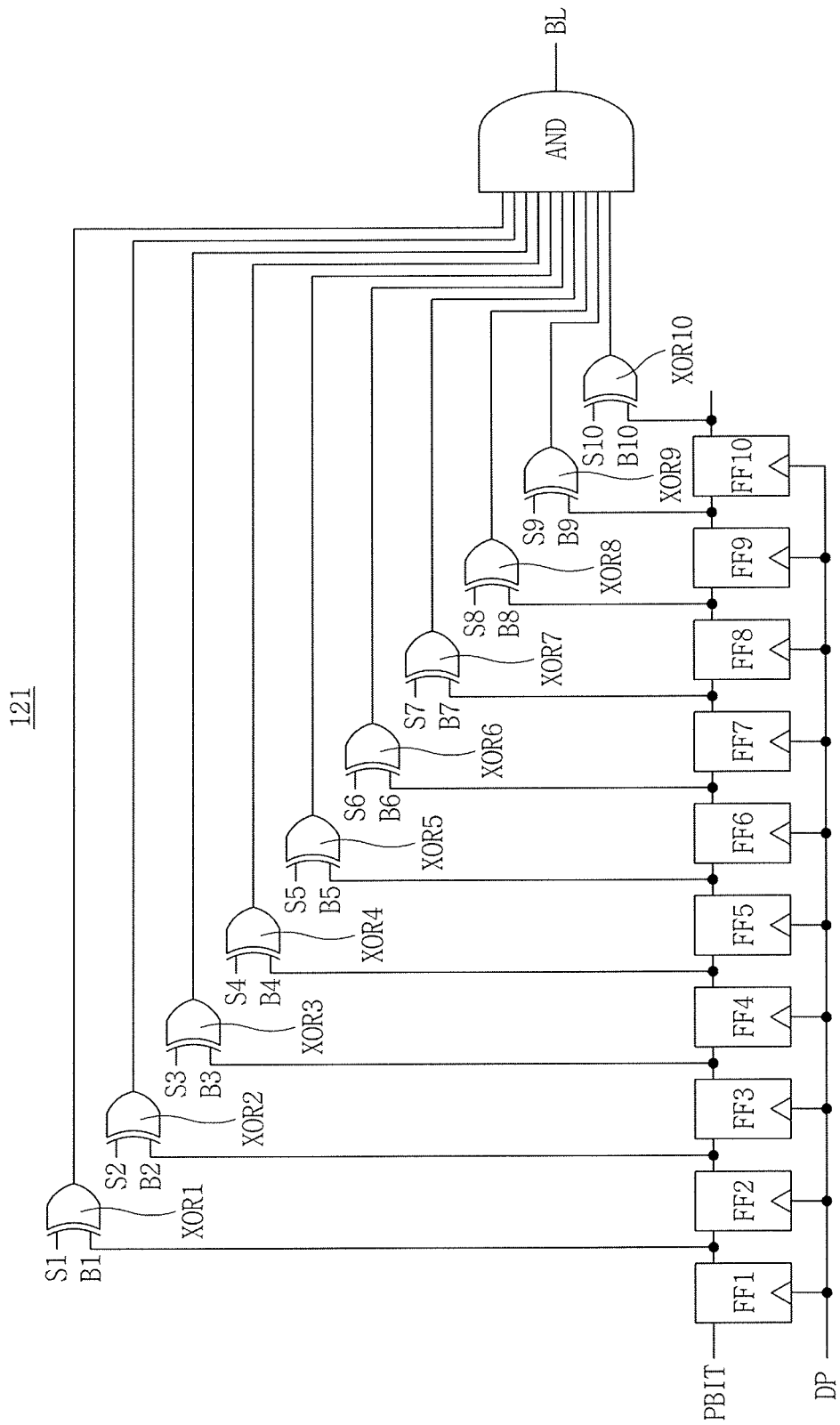
FIG. 6 illustrates a circuit for generating a bit lock signal according to an exemplary embodiment of the inventive concept.

FIG. 6 illustrates a circuit for generating a bit lock signal according to an exemplary embodiment of the inventive concept.

Referring to FIG. 6, the alignment buffer 120 may include a bit lock signal generator 121 that generates a bit lock signal BL which detects a synchronous pattern. The bit lock signal generator 121 may include first to tenth flip-flops FF1 to FF10, first to tenth exclusive OR (XOR) gate circuits XOR1 to XOR10, and an AND gate circuit AND.

Each of the first to tenth flip-flops FF1 to FF10 may be sequentially connected and sequentially receive a PWM bit PBIT in synchronization with a differential positive signal DP.

A synchronization pattern (e.g., a synch pattern) S1 to S10 may include 10 bits. For example, the synch pattern S1 to S10 may be include logic values "0011111010".

The first XOR gate circuit XOR1 receives a first output B1 of the first flip-flop FF1 and a first bit S1 of the synch pattern. The first XOR gate circuit XOR1 compares the first bit S1 of the synch pattern with the first output B1 of the first flip-flop FF1.

When the first output B1 of the first flip-flop FF1 is equal to the first bit S1 of the synch pattern, the first XOR gate circuit XOR1 transmits a logic value "1" to the AND gate circuit AND. When the first output B1 of the first flip-flop FF1 is not equal to the first bit S1 of the synch pattern, the first XOR gate circuit XOR1 transmits a logic value "0" to the AND gate circuit AND.

The second XOR gate circuit XOR2 receives a second output B2 of the second flip-flop FF2 and the second bit S2 of the synch pattern. The second XOR gate circuit XOR2 compares the second bit S2 of the synch pattern with the second output B2 of the second flip-flop FF2.

When the second output B2 of the second flip-flop FF2 is equal to the second bit S2 of the synch pattern, the second XOR gate circuit XOR2 transmits a logic value "1" to the AND gate circuit AND. When the second output B2 of the second flip-flop FF2 is not equal to the second bit S2 of the synch pattern, the second XOR gate circuit XOR2 transmits a logic value "0" to the AND gate circuit AND.

The third XOR gate circuit XOR3 receives a third output B3 of the third flip-flop FF3 and the third bit S3 of the synch pattern. The third XOR gate circuit XOR3 compares the third bit S3 of the synch pattern with the third output B3 of the third flip-flop FF3.

When the third output B3 of the third flip-flop FF3 is equal to the third bit S3 of the synch pattern, the third XOR gate circuit XOR3 transmits a logic value "1" to the AND gate circuit AND. When the third output B3 of the third flip-flop FF3 is not equal to the third bit S3 of the synch pattern, the third XOR gate circuit XOR3 transmits a logic value "0" to the AND gate circuit AND.

The fourth XOR gate circuit XOR4 receives a fourth output B4 of the fourth flip-flop FF4 and the fourth bit S4 of the synch pattern. The fourth XOR gate circuit XOR4 compares the fourth bit S4 of the synch pattern with the fourth output B4 of the fourth flip-flop FF4.

When the fourth output B4 of the fourth flip-flop FF4 is equal to the fourth bit S4 of the synch pattern, the fourth XOR gate circuit XOR4 transmits a logic value "1" to the AND gate circuit AND. When the fourth output B4 of the fourth flip-flop FF4 is not equal to the fourth bit S4 of the synch pattern, the fourth XOR gate circuit XOR4 transmits a logic value "0" to the AND gate circuit AND.

The fifth XOR gate circuit XOR5 receives a fifth output B5 of the fifth flip-flop FF5 and the fifth bit S5 of the synch pattern. The fifth XOR gate circuit XOR5 compares the fifth bit S5 of the synch pattern with the fifth output B5 of the fifth flip-flop FF5.

When the fifth output B5 of the fifth flip-flop FF5 is equal to the fifth bit S5 of the synch pattern, the fifth XOR gate circuit XOR5 transmits a logic value "1" to the AND gate circuit AND. When the fifth output B5 of the fifth flip-flop FF5 is not equal to the fifth bit S5 of the synch pattern, the fifth XOR gate circuit XOR5 transmits a logic value "0" to the AND gate circuit AND.

The sixth XOR gate circuit XOR6 receives a sixth output B6 of the sixth flip-flop FF6 and the sixth bit S6 of the synch pattern. The sixth XOR gate circuit XOR6 compares the sixth bit S6 of the synch pattern with the sixth output B6 of the sixth flip-flop FF6.

When the sixth output B6 of the sixth flip-flop FF6 is equal to the sixth bit S6 of the synch pattern, the sixth XOR gate circuit XOR6 transmits a logic value "1" to the AND gate circuit AND. When the sixth output B6 of the sixth flip-flop FF6 is not equal to the sixth bit S6 of the synch pattern, the sixth XOR gate circuit XOR6 transmits a logic value "0" to the AND gate circuit AND.

The seventh XOR gate circuit XOR7 receives a seventh output B7 of the seventh flip-flop FF7 and the seventh bit S7 of the synch pattern. The seventh XOR gate circuit XOR7 compares the seventh bit S7 of the synch pattern with the seventh output B7 of the seventh flip-flop FF7.

When the seventh output B7 of the seventh flip-flop FF7 is equal to the seventh bit S7 of the synch pattern, the seventh XOR gate circuit XOR7 transmits a logic value "1" to the AND gate circuit AND. When the seventh output B7 of the seventh flip-flop FF7 is not equal to the seventh bit S7 of the synch pattern, the seventh XOR gate circuit XOR7 transmits a logic value "0" to the AND gate circuit AND.

The eighth XOR gate circuit XOR8 receives an eighth output B8 of the eighth flip-flop FF8 and the eighth bit S8 of the synch pattern. The eighth XOR gate circuit XOR8 compares the eighth bit S8 of the synch pattern with the eighth output B8 of the eighth flip-flop FF8.

When the eighth output B8 of the eighth flip-flop FF8 is equal to the eighth bit S8 of the synch pattern, the eighth XOR gate circuit XOR8 transmits a logic value "1" to the AND gate circuit AND. When the eighth output B8 of the eighth flip-flop FF8 is not equal to the eighth bit S8 of the synch pattern, the eighth XOR gate circuit XOR8 transmits a logic value "0" to the AND gate circuit AND.

The ninth XOR gate circuit XOR9 receives a ninth output B9 of the ninth flip-flop FF9 and the ninth bit S9 of the synch pattern. The ninth XOR gate circuit XOR9 compares the ninth bit S9 of the synch pattern with the ninth output B9 of the ninth flip-flop FF9.

When the ninth output B9 of the ninth flip-flop FF9 is equal to the ninth bit S9 of the synch pattern, the ninth XOR gate circuit XOR9 transmits a logic value "1" to the AND gate circuit AND. When the ninth output B9 of the ninth flip-flop FF9 is not equal to the ninth bit S9 of the synch pattern, the ninth XOR gate circuit XOR9 transmits a logic value "0" to the AND gate circuit AND.

The tenth XOR gate circuit XOR10 receives a tenth output B10 of the tenth flip-flop FF10 and the tenth bit S10 of the synch pattern. The tenth XOR gate circuit XOR10 compares the tenth bit S10 of the synch pattern with the tenth output B10 of the tenth flip-flop FF10.

When the tenth output B10 of the tenth flip-flop FF10 is equal to the tenth bit S10 of the synch pattern, the tenth XOR gate circuit XOR10 transmits a logic value "1" to the AND gate circuit AND. When the tenth output B10 of the tenth flip-flop FF10 is not equal to the tenth bit S10 of the synch pattern, the tenth XOR gate circuit XOR10 transmits a logic value "0" to the AND gate circuit AND.

The AND gate circuit AND may receive an output of each of the first to tenth XOR gates XOR1 to XOR10. The AND gate circuit AND may activate the bit lock signal BL when all of the first to tenth XOR gates XOR1 to XOR10 have the logic value "1".

Figure 7:
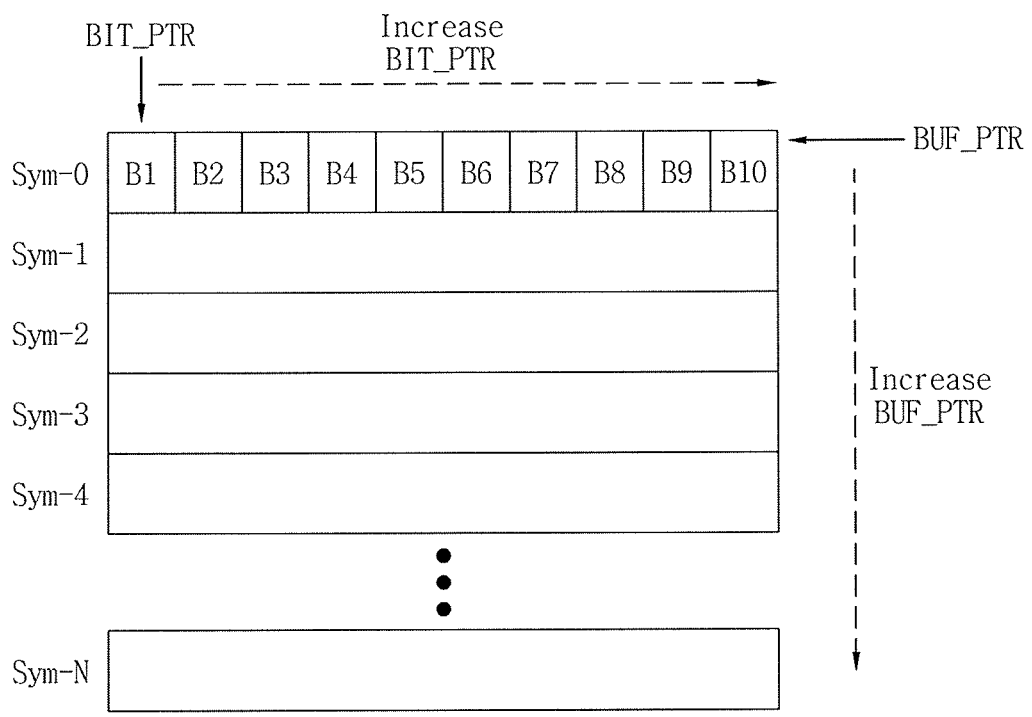
FIG. 7 is a block diagram illustrating an alignment buffer shown in FIG. 4 according to an exemplary embodiment of the inventive concept.

FIG. 7 is a block diagram illustrating the alignment buffer shown in FIG. 4 according to an exemplary embodiment of the inventive concept.

Referring to FIGS. 4, 6 and 7, the alignment buffer 120 may store symbol data SYM. In an exemplary embodiment, the symbol data SYM may include 10 bits, however the symbol data SYM is not limited thereto. When the symbol data SYM includes 10 bits, data stored in each of the first to tenth flip-flops FF1 to FF10 includes one portion of the symbol data SYM.

When the bit lock signal BL is activated, the alignment buffer 120 may store a PWM bit PBIT by increasing a bit pointer BIT_PTR.

An alignment of the symbol data SYM may be arranged due to the bit lock signal BL. Accordingly, when an alignment of the symbol data SYM is misaligned, the alignment buffer 120 may recover the symbol data SYM using the bit lock signal BL.

Further, the alignment buffer 120 may increase the buffer pointer BUF_PTR. A method of increasing the buffer pointer BUF_PTR is described in detail with reference to FIG. 8.

Figure 8:
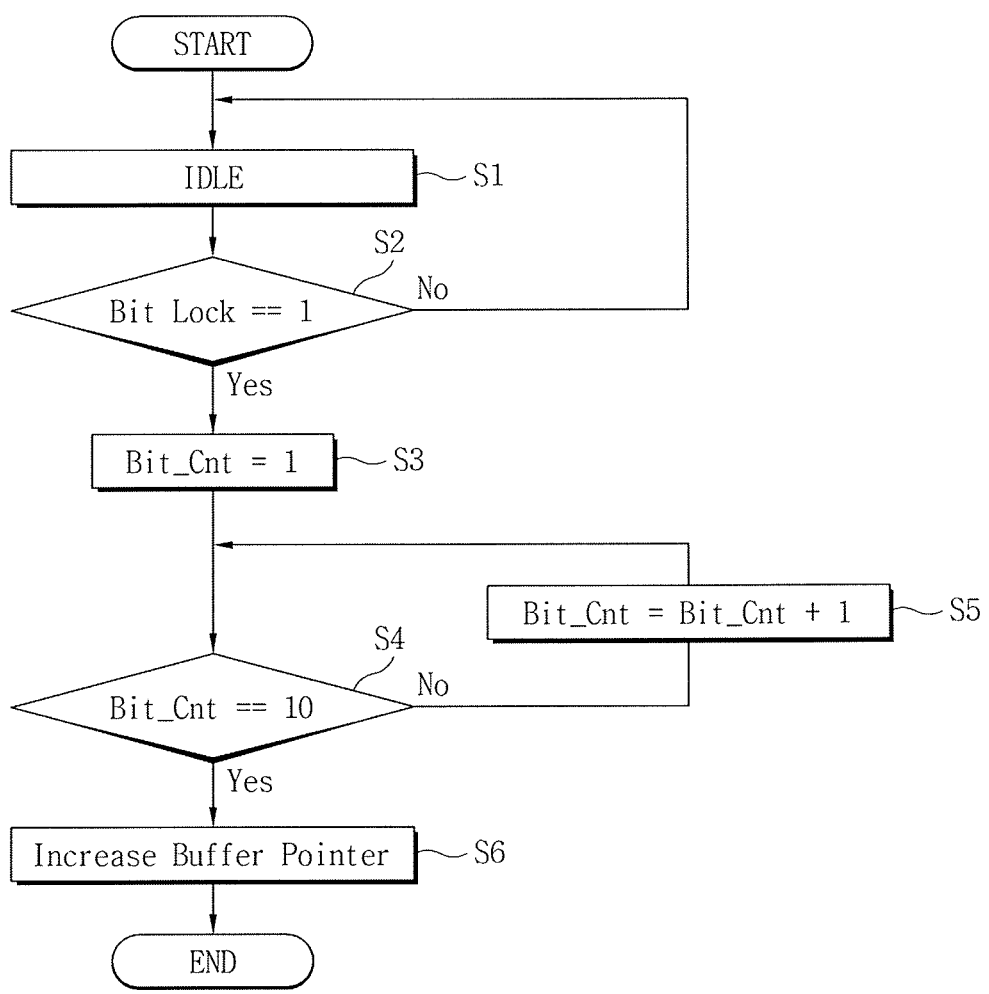
FIG. 8 is a flowchart illustrating a method of increasing a buffer pointer according to an exemplary embodiment of the inventive concept.

FIG. 8 is a flowchart illustrating a method of increasing the buffer pointer according to an exemplary embodiment of the inventive concept.

A method of increasing the buffer pointer BUF_PTR according to an exemplary embodiment of the inventive concept is described below with reference to FIGS. 6, 7 and 8.

In operation S1, the alignment buffer 120 remains in an idle state IDLE.

In operation S2, the alignment buffer 120 determines whether a bit lock signal BL is activated. When the bit lock generator 121 activates the bit lock signal BL, operation S3 is executed. Otherwise, operation S1 is executed.

In operation S3, the alignment buffer 120 initializes a bit count Bit_Cnt. For example, the alignment buffer 120 may initialize the bit count Bit_Cnt as 1.

The symbol data SYM may include 10 PWM bits PBIT. In operation S4, the alignment buffer 120 determines whether the bit count Bit_Cnt is 10. When the bit count Bit_Cnt is 10, operation S6 is executed. Otherwise, operation S5 is executed.

In operation S5, the alignment buffer 120 increases the bit count Bit_Cnt. When the bit count Bit_Cnt is increased, the alignment buffer 120 may also increase the bit pointer BIT_PTR.

In operation S6, the alignment buffer 120 increases the buffer pointer BUF_PTR.

Figure 9:
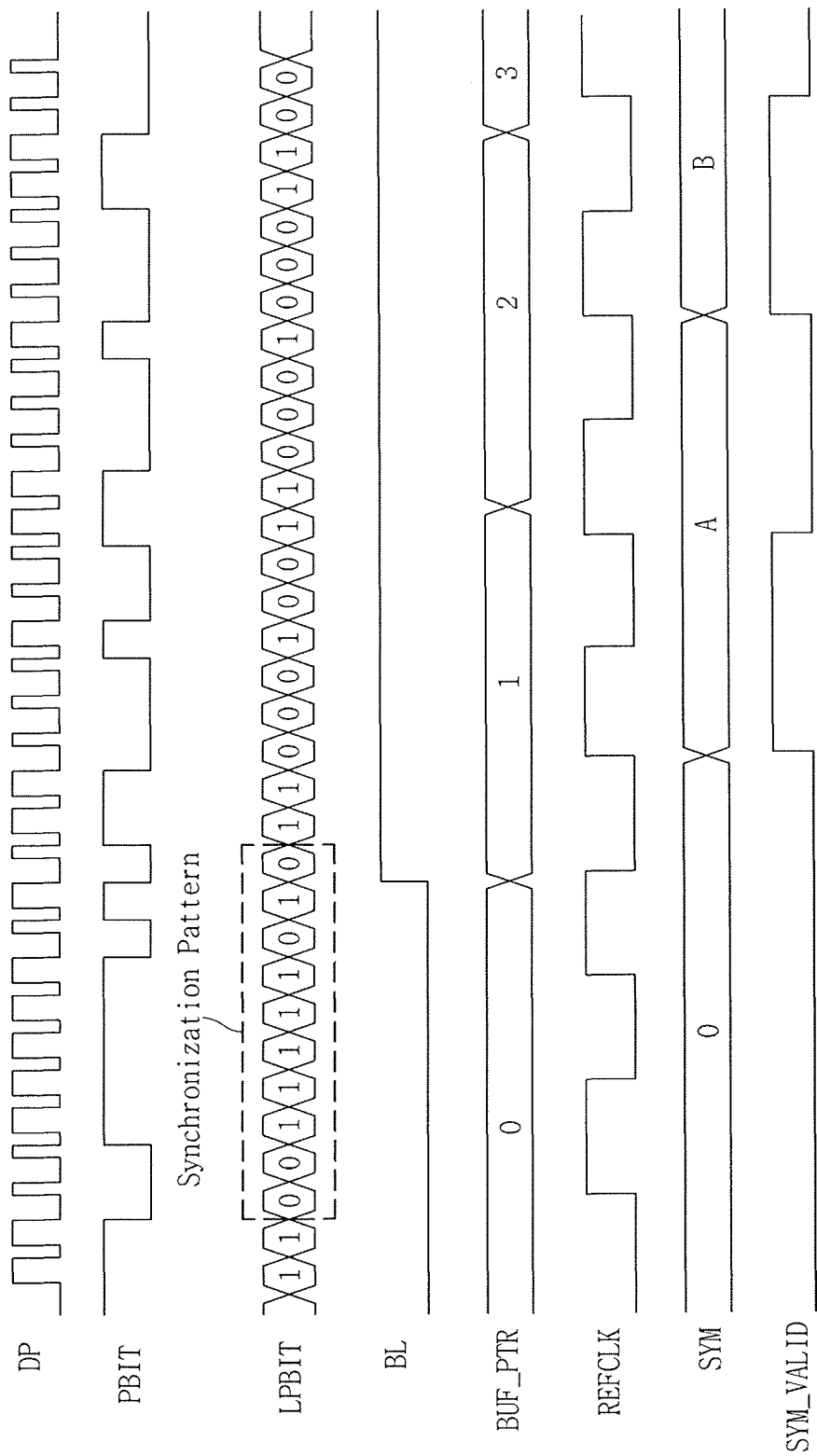
FIG. 9 is a timing diagram illustrating a write operation and a read operation of the alignment buffer shown in FIG. 4 according to an exemplary embodiment of the inventive concept.

FIG. 9 is a timing diagram illustrating a write operation and a read operation of the alignment buffer shown in FIG. 4 according to an exemplary embodiment of the inventive concept.

Referring to FIGS. 4, 6, 7 and 9, the DTS circuit 110 receives a differential positive data signal DP and a differential negative data signal DN. The DTS circuit 110 generates a PWM bit PBIT using the differential positive data signal DP and the differential negative data signal DN. The DTS circuit 110 transmits the PWM bit PBIT to the alignment buffer 120.

A write operation of the alignment buffer 120 is described as follows.

The alignment buffer 120 may store the PWM bit PBIT. The alignment buffer 120 may compare the PWM bit PBIT (e.g., a latched PWM bit LPBIT) and a synch pattern.

When the latched PWM bit LPBIT coincides with the synch pattern, the alignment buffer 120 activates a bit lock signal BL. As shown in FIG. 9, in an example, the synch pattern may be "0011111010".

When the bit lock signal BL is activated, a bit count Bit_Cnt may be increased. When the bit count Bit_Cnt is 10, a buffer pointer BUF_PTR may be increased. The alignment buffer 120 may store the PWM bit PBIT according to the increased buffer pointer BUF_PTR. The alignment buffer 120 may store the PWM bit PBIT in units of bits (e.g., as separate bits) and output symbol data SYM in units of symbols (e.g., a collection of bits forming a symbol).

A read operation of the alignment buffer 120 is described as follows.

The alignment buffer 120 transmits the symbol data SYM to the PWM data processing logic circuit 130 in synchronization with a reference clock REFCLK. The alignment buffer 120 further transmits a symbol valid signal SYM_VALID to the PWM data processing logic circuit 130.

When the symbol valid signal SYM_VALID is activated, the PWM data processing logic circuit 130 may receive the symbol data SYM in synchronization with the reference clock REFCLK.

Since the timing of the differential positive data signal DP and the differential negative data signal DN is different, the alignment buffer 120 may be in a full or empty state. Accordingly, the alignment buffer 120 may constantly output the symbol data SYM to the PWM data processing logic circuit 130 in response to the symbol valid signal SYM_VALID.

Figure 10:
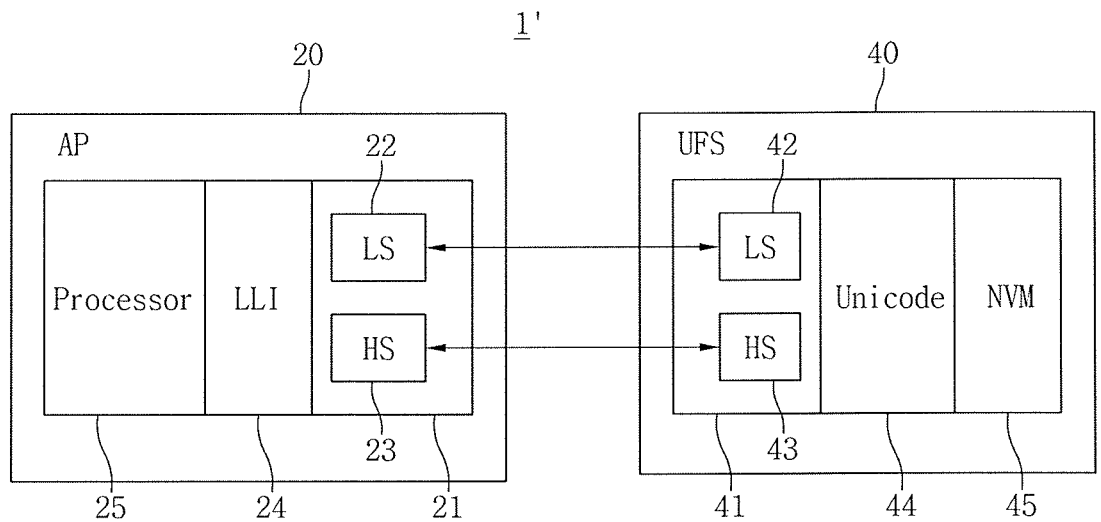
FIG. 10 is a block diagram illustrating an SoC according to an exemplary embodiment of the inventive concept.

FIG. 10 is a block diagram illustrating an SoC according to an exemplary embodiment of the inventive concept.

Referring to FIG. 10, an SoC 1' according to an exemplary embodiment of the inventive concept includes an AP 20 and a universal flash storage (UFS) 40.

The AP 20 may include an AP physical layer M-PHY 21, an LLI 24, and a processor 25. The AP physical layer M-PHY 21 may include an AP LS unit 22 that implements low-speed data communication and an AP HS unit 23 that implements high-speed data communication. The AP physical layer M-PHY 21 physically connects the AP 20 to the UFS 40. Accordingly, the AP 20 and the UFS 40 may communicate with each other through the AP physical layer M-PHY 21. The LLI 24 operates according to an LLI specification. The processor 25 may perform basic arithmetic operations, and may control the operation of the AP 20.

The UFS 40 may include a UFS physical layer M-PHY 41, a unicode function block 44, and a nonvolatile memory device NVM 45.

The UFS physical layer M-PHY 41 may include a UFS LS unit 42 that implements low-speed data communication and a UFS HS unit 43 that implements high-speed data communication. The UFS physical layer M-PHY 41 physically connects the AP 20 to the UFS 40. The unicode function block 44 may interface the UFS physical layer M-PHY 41 with the nonvolatile memory device NVM 45.

Each of the AP and UFS LS units 22 and 42 may include the PWM data recovery device 100 shown in FIG. 4 to recover PWM data.

According to exemplary embodiments, the AP 20 and the UFS 40 may be embodied together in one independent chip or in separate chips.

Figure 11:
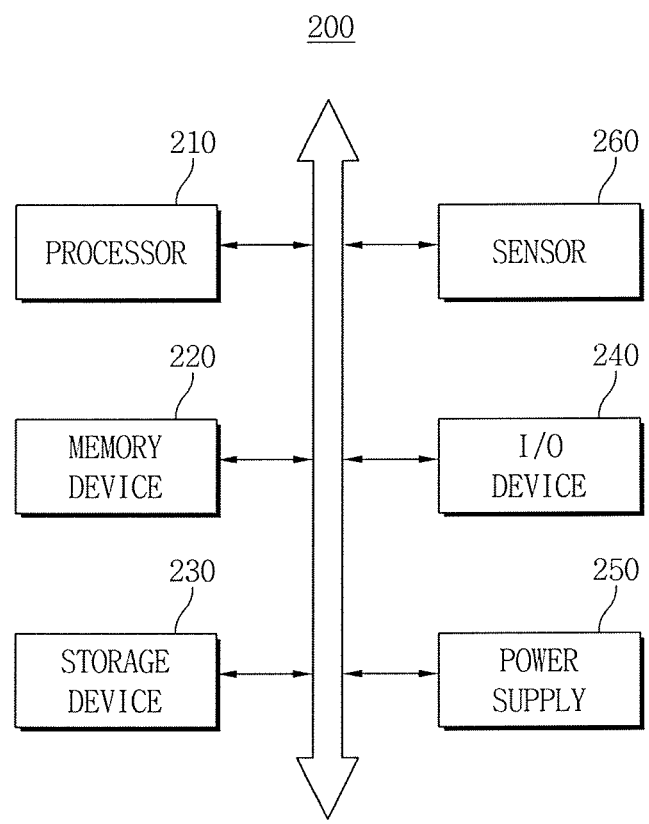
FIG. 11 is a block diagram illustrating a computing system including the SoC shown in FIG. 1 according to an exemplary embodiment of the inventive concept.

FIG. 11 is a block diagram illustrating a computing system including the SoC shown in FIG. 1 according to an exemplary embodiment of the inventive concept.

Referring to FIG. 11, a computing system 200 may include a processor 210, a memory device 220, a storage device 230, an input/output device 240, a power supply 250, and an image sensor 260.

The computing system 200 may communicate with, for example, a video card, a sound card, a memory card, a USB device, etc.

The processor 210 may perform specific calculations or tasks. In an exemplary embodiment, the processor 210 may include a micro-processor and a central processing unit (CPU). The processor 210 may communicate with the memory device 220, the storage device 230, and the input/output device 240 through, for example, an address bus, a control bus, and a data bus.

In an exemplary embodiment, the processor 210 may be connected to an extension bus such as, for example, a peripheral component interconnect (PCI) bus. The processor 210 may include, for example, the SoC 10 shown in FIG. 1.

The memory device 220 may store data used to implement an operation(s) of the computing system 200. For example, the memory device 220 may be embodied as a DRAM, a mobile DRAM, a static RAM (SRAM), a phase change RAM (PRAM), a ferroelectric RAM (FRAM), a resistive RAM (RRAM), a magnetic RAM (MRAM), etc.

The storage device 230 may include, for example, a solid state drive (SSD), a hard disk drive (HDD), an optical disk drive (ODD) (e.g., a CD-ROM), etc.

The input/output device 240 may include input units such as, for example, a keyboard, a keypad, a mouse, a touchscreen interface, etc., and output units such as, for example, a printer, a display, etc.

The power supply 250 may supply an operating voltage used to implement an operation(s) of the computing system 200.

The image sensor 260 may communicate with the processor 210 through the bus or another communication link. The image sensor 260 and the processor 210 may be integrated together on one chip or on separate chips.

The computing system 200 may be, for example, a digital camera, a mobile phone, a personal digital assistant (PDA), a portable multimedia player (PMP), a smartphone, etc.

Figure 12:
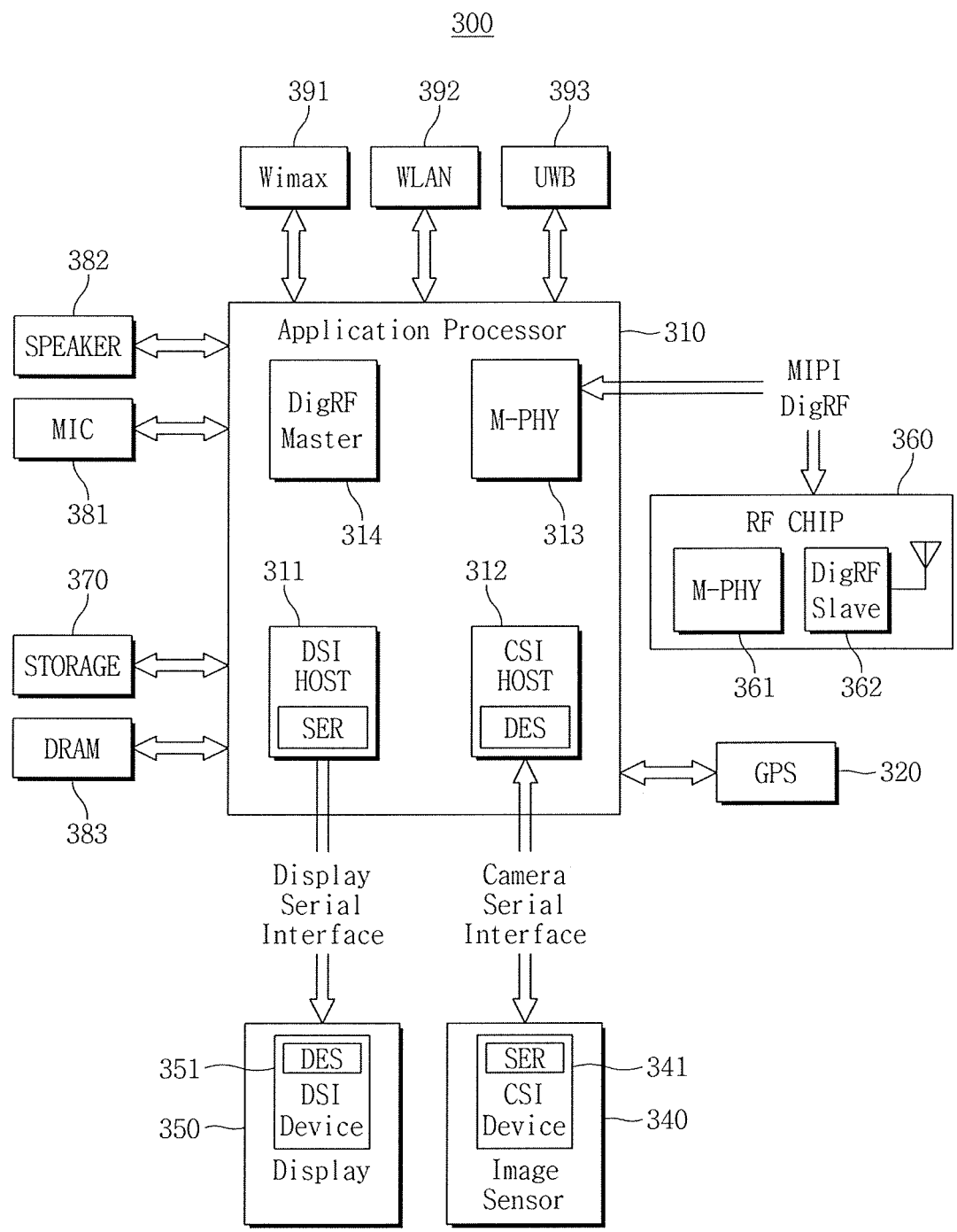
FIG. 12 is a block diagram illustrating an exemplary embodiment of an interface used in the computing system shown in FIG. 11 according to an exemplary embodiment of the inventive concept.

FIG. 12 is a block diagram illustrating an exemplary embodiment of an interface used in the computing system shown in FIG. 11 according to an exemplary embodiment of the inventive concept.

Referring to FIG. 12, a computing system 300 may be embodied as a data processing device capable of supporting a MIPI interface, and may include, for example, an AP 310, an image sensor 340, and a display device 350.

A camera serial interface (CSI) host 312 in the AP may perform a serial communication operation with a CSI device 341 in the image sensor 340 through a CSI. In an exemplary embodiment, the AP 310 may include the SoC 10 shown in FIG. 1.

In an exemplary embodiment, the CSI host 312 may include a deserializer (DES), and the CSI device 341 may include a serializer (SER).

A display serial interface (DSI) host 311 in the AP 310 may perform a serial communication operation with a DSI device 351 in the display device 350 through a DSI. In an exemplary embodiment, the CSI host 311 may include a serializer (SER) and the DSI device 351 may include a deserializer (DES).

The computing system 300 may further include a radio frequency (RF) chip 360 which may communicate with the AP 310. A physical layer M-PHY 313 in the AP 310 and a physical layer M-PHY 361 in the RF chip 360 may perform data transmitting and receiving operations according to a MIPI DigRF. The AP 310 may further include a DigRF MASTER 314 that controls the transmission and reception of data according to the MIPI DigRF, and the RF chip 360 may include a DigRF SLAVE 362.

The computing system 300 may further include, for example, a global positioning system (GPS) 320, a storage unit 370, a microphone 381, a speaker 382, and a DRAM 383.

The computing system 300 may communicate with other devices using, for example, a worldwide interoperability for microwave access (WiMAX) transceiver 391, a wireless local area network (WLAN) 392, and an ultra wideband (UWB) transceiver 393.

Figure 13:
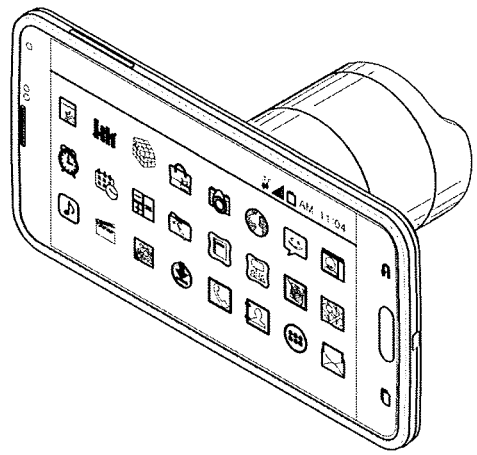
FIG. 13 illustrates a digital camera device including the SoC shown in FIG. 1 according to an exemplary embodiment of the inventive concept.

FIG. 13 illustrates a digital camera device 400 including the SoC shown in FIG. 1 according to an exemplary embodiment of the inventive concept.

Referring to FIG. 13, a digital camera device 400 may operate using an Android™ operating system (OS). The digital camera device 400 may include, but is not limited to, a Galaxy Camera™ or Galaxy Camera 2™.

The digital camera device 400 may include an image sensor that captures an image or video, and an AP that controls the image sensor. In an exemplary embodiment, the digital camera device 400 may include the SoC 1 shown in FIG. 1.

Figure 14A:
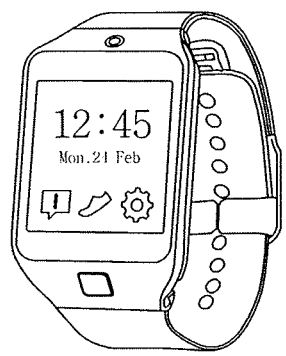
FIGS. 14A and 14B illustrate wearable devices including the SoC shown in FIG. 1 according to an exemplary embodiment of the inventive concept.
Figure 14B:
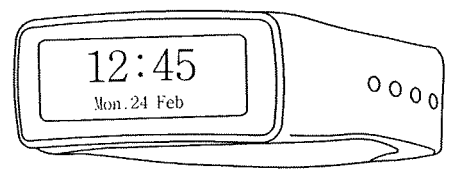

FIGS. 14A and 14B illustrate wearable devices including the SoC shown in FIG. 1 according to exemplary embodiments of the inventive concept.

Referring to FIGS. 14A and 14B, each of the first and second wearable devices 510 and 520 is a type of a wrist watch. Each of the first and second wearable devices 510 and 520 operates using an Android™ OS or TIZEN™ OS.

In an exemplary embodiment, the first wearable device 510 may include a Galaxy Gear 2™ and the second wearable device 520 may include a Galaxy GearFit™.

Each of the first and second wearable devices 510 and 520 may include an AP which operates using an Android™ OS or TIZEN™ OS, an image sensor that captures an image or a video, and a display device which displays the image or video.

In an exemplary embodiment, each of the first and second wearable devices 510 and 520 may include the SoC 1 shown in FIG. 1.

Figure 15:
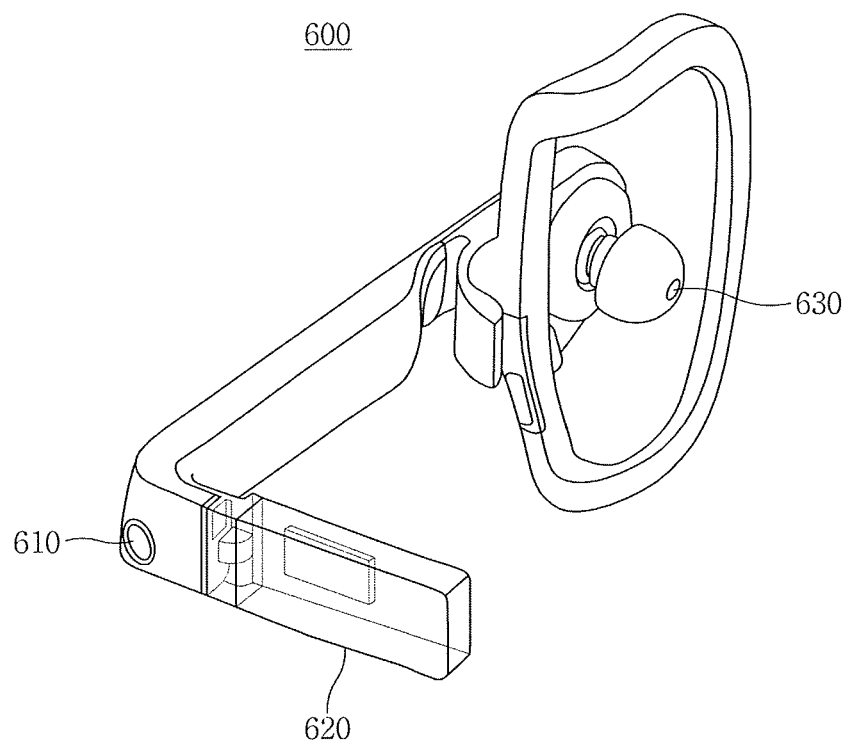
FIG. 15 illustrates a wearable device including the SoC shown in FIG. 1 according to an exemplary embodiment of the inventive concept.

FIG. 15 illustrates a wearable device including the SoC shown in FIG. 1 according to an exemplary embodiment of the inventive concept.

Referring to FIG. 15, a third wearable device 600 may be worn in an ear and provide sound and image information to a user. The third wearable device 600 operates using an Android™ OS or TIZEN™ OS. In an exemplary embodiment, the third wearable device 600 may include a Galaxy Gear Blink™.

The third wearable device 600 may include an image sensor 610 that captures an image and a video, a display device 620 that displays the image and video, an earphone 630 that detects sound (e.g., a voice), and an AP that controls the third wearable device 600. In an exemplary embodiment, the third wearable device 600 may include the SoC 1 shown in FIG. 1.

According to exemplary embodiments of the inventive concept, the PWM data recovery device 100 may receive a last additional PWM bit, may recover symbol data when an alignment of the PWM data signal is misaligned, and/or may not have a system clock dependency due to the exclusion of a system clock.

Exemplary embodiments of the inventive concept may be applied to a mobile device or a wearable device including the SoC described herein.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A pulse width modulation (PWM) data recovery device, comprising:
   a differential-to-single (DTS) circuit configured to generate a PWM bit using a differential data signal comprising a differential positive data signal and a differential negative data signal;
   a PWM data processing logic circuit; and
   an alignment buffer configured to activate a bit lock signal by detecting a synch pattern, recover symbol data by receiving the PWM bit in synchronization with one of the differential positive data signal and the differential negative data signal, and transmit the symbol data to the PWM data processing logic circuit,
   wherein a reference clock is received by the alignment buffer and the PWM data processing logic circuit, and the symbol data is transmitted from the alignment buffer to the PWM data processing logic circuit in synchronization with the reference clock.

2. The PWM data recovery device of claim 1, wherein a phase of the differential positive data signal and a phase of the differential negative data signal are opposite to each other.

3. The PWM data recovery device of claim 2, wherein the alignment buffer is configured to store the PWM bit in units of bits in synchronization with the differential positive data signal or the differential negative data signal, and transmit the symbol data in units of symbols in synchronization with the reference clock.

4. The PWM data recovery device of claim 2, wherein the DTS circuit is configured to delay one of the differential positive data signal and the differential negative data signal.

5. The PWM data recovery device of claim 1, wherein the PWM bit is one of a plurality of PWM bits, and the alignment buffer is configured to compare the synch pattern with the PWM bits received from the DTS circuit and activate the bit lock signal according to a result of the comparison of the synch pattern with the PWM bits.

6. The PWM data recovery device of claim 1, wherein the DTS circuit comprises a decoder configured to generate the PWM bit using the differential data signal, and the decoder is an integrator-type decoder or an oversampling-type decoder.

7. The PWM data recovery device of claim 1, wherein the reference clock is a phase locked loop (PLL) reference clock.

8. A method of driving a pulse width modulation (PWM) data recovery device, comprising:
   generating a PWM bit using a differential data signal;
   activating a bit lock signal, by an alignment buffer, by detecting a synch pattern;
   recovering symbol data by receiving the PWM bit in synchronization with the differential data signal in response to the bit lock signal being activated; and
   transmitting the symbol data from the alignment buffer to a PWM data processing logic circuit,
   wherein a reference clock is received by the alignment buffer and the PWM data processing logic circuit, and the symbol data is transmitted from the alignment buffer to the PWM data processing logic circuit in synchronization with the reference clock.

9. The method of claim 8, wherein the differential data signal comprises a differential positive data signal and a differential negative data signal, and a phase of the differential positive data signal and a phase of the differential negative data signal are opposite to each other.

10. The method of claim 9, wherein recovering the symbol data comprises storing the PWM bit in units of bits in synchronization with the differential positive data signal or the differential negative data signal.

11. The method of claim 9, further comprising:
    delaying one of the differential positive data signal and the differential negative data signal.

12. The method of claim 8, wherein the symbol data is transmitted in units of symbols.

13. The method of claim 8, wherein activating the bit lock signal comprises:
    comparing the synch pattern with a plurality of PWM bits, wherein the PWM bit is one of the plurality of PWM bits; and
    activating the bit lock signal according to a result of the comparison of the synch pattern with the PWM bits.

14. The method of claim 8, wherein the reference clock is a phase locked loop (PLL) reference clock.

15. A system-on-chip (SoC), comprising:
    a modulator-demodulator (MODEM) comprising a first physical layer, wherein the first physical layer comprises a first low speed unit and a first high speed unit; and
    an application processor (AP) comprising a second physical layer, wherein the second physical layer comprises a second low speed unit and a second high speed unit,
    wherein the MODEM and the AP communicate with each other through the first and second physical layers, and each of the first and second low speed units comprises a pulse width modulation (PWM) data recovery device, comprising:
    a differential-to-single (DTS) circuit configured to generate a PWM bit using a differential data signal comprising a differential positive data signal and a differential negative data signal;
    a PWM data processing logic circuit; and
    an alignment buffer configured to activate a bit lock signal by detecting a synch pattern, recover symbol data by receiving the PWM bit in synchronization with one of the differential positive data signal and the differential negative data signal, and transmit the symbol data to the PWM data processing logic circuit,
    wherein a reference clock is received by the alignment buffer and the PWM data processing logic circuit, and the symbol data is transmitted from the alignment buffer to the PWM data processing logic circuit in synchronization with the reference clock.

16. The SoC of claim 15, wherein a phase of the differential positive data signal and a phase of the differential negative data signal are opposite to each other.

17. The SoC of claim 16, wherein the DTS circuit is configured to delay one of the differential positive data signal and the differential negative data signal.

18. The SoC of claim 15, wherein the DTS circuit comprises:
    a decoder configured to generate the PWM bit using the differential data signal, wherein the decoder is an integrator-type decoder or an oversampling-type decoder.

* * * * *